United States Patent
Rao et al.

(10) Patent No.: US 6,782,126 B2
(45) Date of Patent: Aug. 24, 2004

(54) METHOD FOR COMBINING FEATURE DISTANCE WITH SPATIAL DISTANCE FOR SEGMENTATION

(75) Inventors: Ravishankar Rao, White Plains, NY (US); Kuo Chung-Hui, Minneapolis, MN (US); Gerhard R. Thompson, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 552 days.

(21) Appl. No.: 09/785,396

(22) Filed: Feb. 20, 2001

(65) Prior Publication Data

US 2002/0146166 A1 Oct. 10, 2002

(51) Int. Cl.$^7$ ................................................ G06K 9/34
(52) U.S. Cl. ...................................................... 382/164
(58) Field of Search ............................... 382/162–167, 382/173–180; 358/500–540

(56) References Cited

U.S. PATENT DOCUMENTS

| | | | | |
|---|---|---|---|---|
| 6,128,407 A | * | 10/2000 | Inoue et al. | 382/167 |
| 6,381,363 B1 | * | 4/2002 | Murching | 382/164 |
| 6,483,940 B1 | * | 11/2002 | Wang | 382/164 |
| 6,529,202 B2 | * | 3/2003 | Wu | 345/593 |

OTHER PUBLICATIONS

Kuo "Unsupervised color image segmentation for content based application" IEEE International Confference on Multimedia and Expo, 2000 vol. 3, pp. 1515–1518, Aug. 2000.*

Article titled "Unsupervised Color Image Segmentation for Content Based Application" Chumg Hui Kuo and Ahmed H. Tewfik; dated 2000.

Article titled "Sigma Filter Based Unsupervised Color Image Segmentation" Chumg Hui Kuo and Ahmed H. Tewfik; dated 2000.

Pattern Recognition, by S. Theodoridis and K. Koutroumbas, Academic Press, 1999, pp. 387–392.

Pattern Recognition by S. Theodoridis and K. Koutroumbas, Academic Press, 1999, pp. 497–502.

Algorithms for Clustering Data, by A.K. Jain and R. C. Dubes, Prentice Hall, 1988, pp. 120–124.

Robot Vision, by B. K. P. Horn, MIT Press, 1986, pp. 65–71.

* cited by examiner

Primary Examiner—Jingge Wu
(74) Attorney, Agent, or Firm—Whitham, Curtis & Christofferson, P.C.; Stephen C. Kaufman

(57) ABSTRACT

A method for the complete segmentation of an image into regions of near-uniform color first segments the image into blocks of size N×M and applies color clustering within these blocks. This is done with a sequential color clustering algorithm. Subsequent to this, the color clusters that are spatially adjacent and also have similar color characteristics are merged. This is done through a novel method which combines distance in the feature space with distance in the spatial domain. This results in spatially compact color regions which have similar color information. The result of applying this technique is a complete segmentation of the image according to regions of near-uniform color.

3 Claims, 5 Drawing Sheets

METHOD FOR COMBINING FEATURE DISTANCE WITH SPATIAL DISTANCE FOR SEGMENTATION

BACKGROUND OF THE INVENTION

1. Field of the Invention

The present invention generally relates to document image analysis and, more particularly, to segmentation of an image using a method which combines distance in the feature space with distance in the spatial domain to produce regions of near-uniform color.

2. Background Description

In many applications, such as document image analysis, and analysis of digital images, an important processing stage is that of segmentation of the image into regions of near-uniform color. The results of this stage are used for further analysis, such as a determination of the number of colors present in the image, identification of regions with specific color and an analysis of geometric features of regions with uniform color. Applying color cluster analysis to the entire image is a time-consuming process, and also results in too many clusters being identified.

SUMMARY OF THE INVENTION

It is therefore an object of the present invention to provide an improved method for the complete segmentation of an image into regions of near-uniform color.

According to the invention, there is provided a method which segments the image into blocks of size M×N (say, 128×128) and applies color clustering within these blocks. This is done with a sequential color clustering algorithm. Subsequent to this, the blocks that have similar color characteristics are identified. Finally, a connected component analysis in the spatial domain is performed to identify blocks that are both similar in color characteristics as well as spatially contiguous. Thus, our invention combines distance in the feature space with distance in the spatial domain. This results in spatially compact color regions which have similar color information.

The result of applying this technique is a complete segmentation of the image according to regions of near-uniform color. This can then be used for performing operations like optical character recognition, or adaptive compression of the image on the number of colors present.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
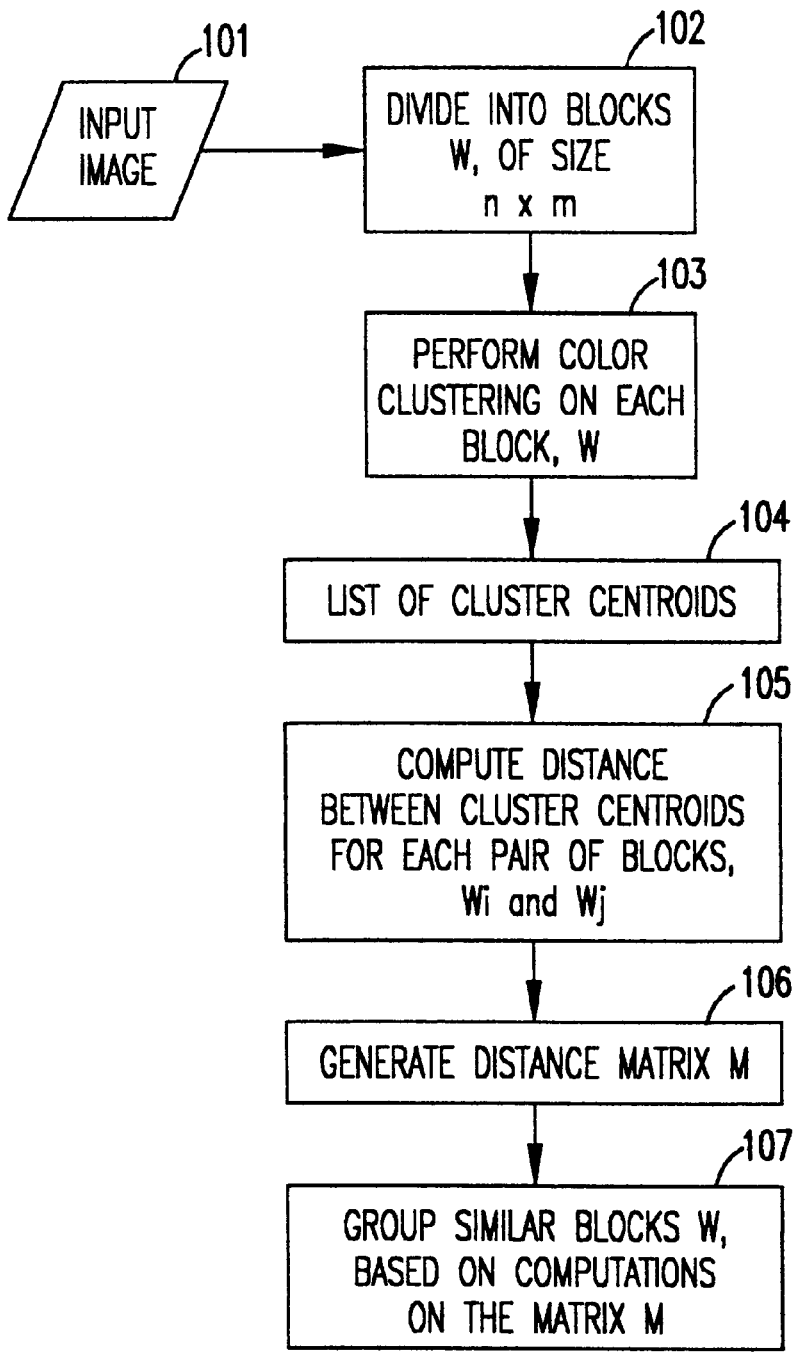
FIG. 1 is a flow diagram showing the logic of the overall process according to the invention.

Referring now to the drawings, and more particularly to FIG. 1, there is shown a flow diagram showing the logic of the operation of the invention. We start with an input image 101, and divide it into rectangular non-overlapping blocks W of size N×M in function block 102. We perform color clustering within the color pixels of each block W in function block 103. There are several techniques described in the literature which allow one to perform such a clustering, such as sequential clustering (see for example, *Pattern Recognition*, by S. Theodoridis and K. Koutroumbas, Academic Press, 1999, pp. 387–392, or N. Ikonomakis, K. N. Plataniotis, and A. N. Venetsanopoulos, "Color image segmentation for multimedia applications", *Journal of Intelligent and Robotic Systems*, vol. 28, no. 1/2, pp. 5–20, June 2000.)

The result of performing color clustering using one of these methods is to obtain a list of centroids 104 for each image block W. In other words, we identify the number of distinct color clusters present within each block W, and represent these clusters by their centroids. This is the starting point for the computations described in this invention.

If we represent the entire image as a union of blocks W with their color cluster descriptions, there would be a lot of redundancy, as we do not recognize that adjacent blocks may have similar colors or that a block with a given color distribution occurs several times in the image. Thus, the purpose of the invention is to achieve a compact description for the entire image.

Hence the next step is to merge these image blocks if they have similar color characteristics. The purpose of this merging operation is to create a compact description of the image. In order to perform this merging we define a distance measure. Blocks that are a small distance from each other according to this measure will be merged. To merge individual image blocks, we use the following similarity measure or distance measure between two image blocks. The distance measure should be able to differentiate between blocks which contain different numbers of clusters as well as blocks with the same number of clusters.

Assume block 1 contains $\lambda$ clusters and block 2 contains $\kappa$ clusters. Each cluster is represented by its centroid, which is a triplet (R,G,B) in RGB (red, green, blue) color space, and the number of points within the cluster. We generate the following matrix:

$$D = \begin{bmatrix} d_{11}^{12} & d_{12}^{12} & \cdots & d_{1\kappa}^{12} \\ d_{21}^{12} & d_{22}^{12} & \cdots & d_{2\kappa}^{12} \\ \vdots & \vdots & \ddots & \vdots \\ d_{\lambda 1}^{12} & d_{\lambda 2}^{12} & \cdots & d_{\lambda\kappa}^{12} \end{bmatrix}$$

where $d_{ij}^{12}$ represents the distance between centroid i in block 1 and centroid j in block 2 in RGB color space.

Next, we compute the following quantities, $DM_1$ and $DM_2$, which represent two minimax types of distance measures:

$$DM_1 = \max_i \left\{ \min_j \{ d_{ij}^{12} \} \right\}$$

$$DM_2 = \max_j \left\{ \min_i \{ d_{ij}^{12} \} \right\}$$

Finally, we define the distance between the two blocks to be:

$$d = \text{Max}\{DM_1, DM_2\}.$$

Figure 2:
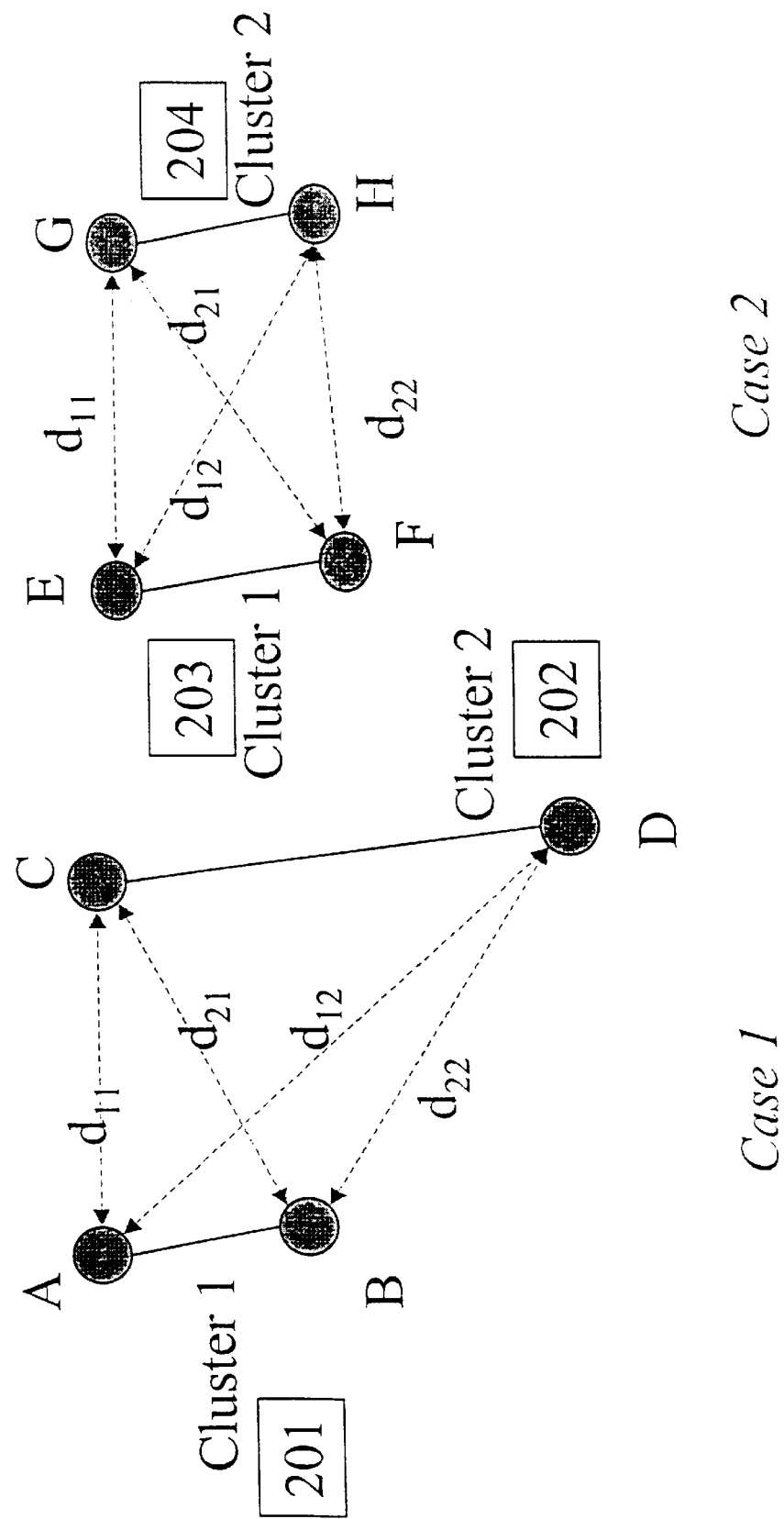
FIG. 2 is a diagram illustrating the computation of the distance measures.

FIG. 2 illustrates the computation of the distance measures for the situation where $\lambda = \kappa = 2$. Case 1 shows two clusters, denoted by cluster 1, 201, and cluster 2, 202, where cluster 1 consists of the points A and B, and cluster 2 consists of the points C and D. A is the first point in cluster 1 and B is the second point in cluster 1, and similarly for points C and D in cluster 2. We measure the distances $d_{ij}$ as indicated by the dashed arrows. Case 2 shows a similar situation, except that the cluster 1, 203, and cluster 2, 204, are closer. Intuitively we expect the distance measure to be smaller in case 2 than in case 1, and this is indeed the result if the above distance measure d=Max $\{DM_1, DM_2\}$ is used.

Referring back to FIG. 1, we compute the distance d between every pair of blocks within the page in function block 105. In function block 106, we generate the matrix M which represents this set of distances, such that $M_{ij}$ is the distance between blocks i and j. The next step in function block 107 is to group together blocks which have similar color characteristics based on the matrix $M_{ij}$.

The rationale for doing this is as follows. It is possible for blocks with the same color characteristics to be scattered throughout the page. For instance, we may have white text on blue background on both sides of a picture in the middle of a page. We would like to group the blocks that designate such white text on blue background into one common grouping even though they may not be spatially contiguous. This results in a reduction of the number of groups that need to be described, and also allows all the members of a group to be treated in a like fashion. For instance, all the members of the above group will have common foreground and background colors. This problem can be cast in a mathematical fashion as follows.

We make use of a graph-theoretic clustering technique based on the Relative Neighborhood Graph or the Region of Influence. This technique has been described in the literature, for instance in *Pattern Recognition* by S. Theodoridis and K. Koutroumbas, Academic Press, 1999, pp. 497–502, and in *Algorithms for Clustering Data* by A. K. Jain and R. C. Dubes, Prentice Hall, 1988, pp. 120–124.

Let x denote the cluster color centroids found within a block of size M×N. We wish to group two such clusters, say $x_i$ and $x_j$ if they satisfy some similarity criteria. A mechanism to implement such a criterion is the following. We identify clusters $x_i$ and $x_j$ as relative neighbors which will be grouped together if and only if both the following conditions hold:

$$d^2(x_i,x_j) \leq \max\{d^2(x_k,x_i),d^2(x_k,x_j)\} \text{ for all } k \neq i \text{ and } k \neq j$$

$$d^2(x_i,x_j) \leq \sigma \min\{d^2(x_k,x_i),d^2(x_k,x_j)\} \text{ for all } k, k \neq i \text{ and } k \neq j$$

where σ is a factor called relative edge consistency and d denotes the distance measure defined earlier. The factor σ controls the fragmentation of the data into different clusters. In our implementation we use a value of a σ=4.5.

Figure 3:
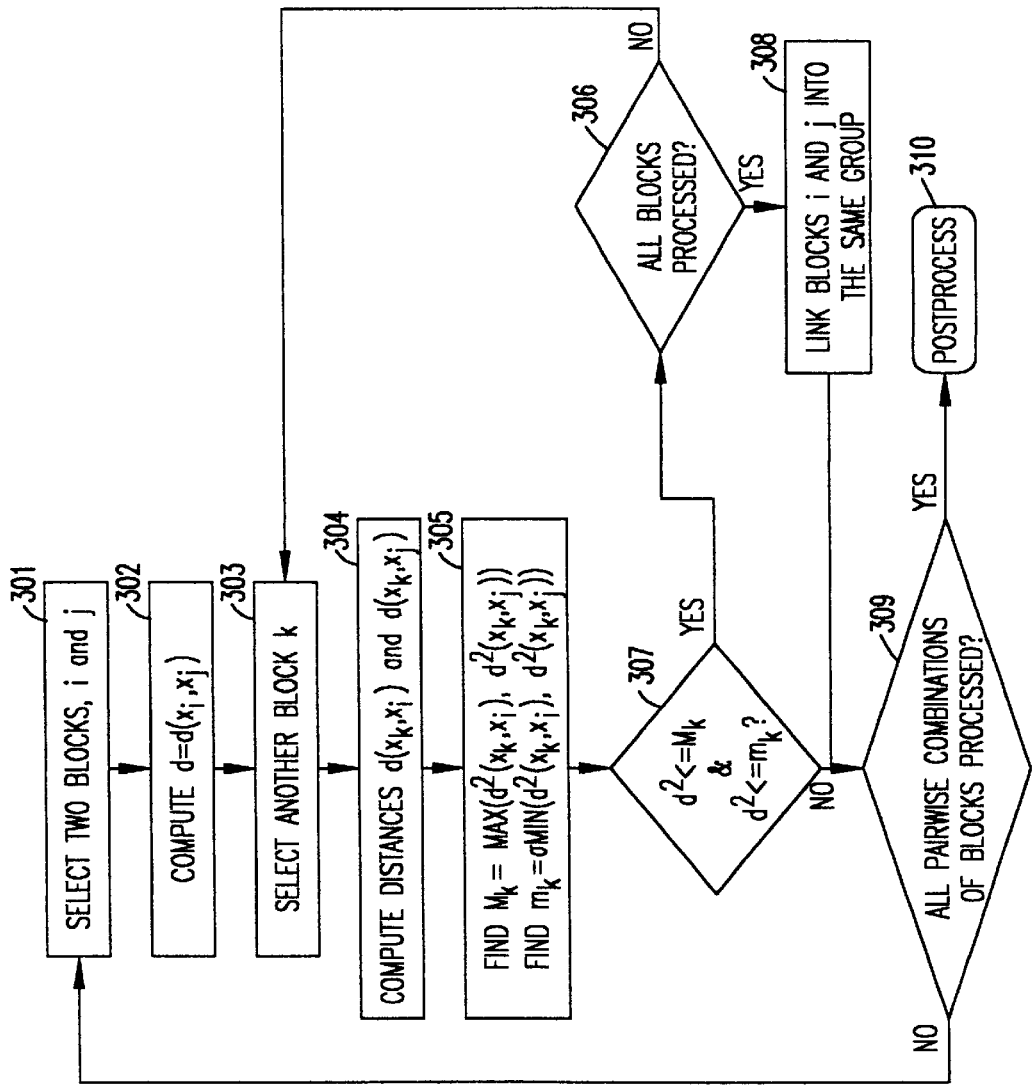
FIG. 3 is a flow diagram showing the logic of the clustering operation.

FIG. 3 shows a flowchart that performs this clustering operation. Blocks are analyzed in pairs, say blocks i and j. The process begins by selecting two blocks, i and j, in function block 301. We compute the distance d between color clusters $x_i$ and $x_j$ that comprise blocks i and j in function block 302. This distance is computed as described earlier in FIG. 1. We select another block k in function block 303 at the beginning of a nested processing loop. The selected block k is distinct from blocks i and j. Next, the computations shown in function blocks 304 and 305 are performed. A test is then made in decision block 307 to determine if $d^2 \leq M_k$ and $d^2 \leq m_k$. If the two conditions on $d^2$ are not met, a determination is made in decision block 309 as to whether all pairwise combinations of blocks have been processed. If not, the process loops back to function block 301 where we select another pair of blocks for analysis. If the two conditions on $d^2$ are met, a further determination is made in decision block 306 as to whether all blocks have been processed. If not, the process loops back to function block 303 where we select another block k. If processing is completed for all blocks, we link blocks i and j into the same group function block 308. We repeat this procedure until all pairwise combinations of blocks have been processed, as determined in decision block 309. The result after completion of processing at 310 is a list of clusters of blocks, as shown in FIG. 5.

Figure 4:
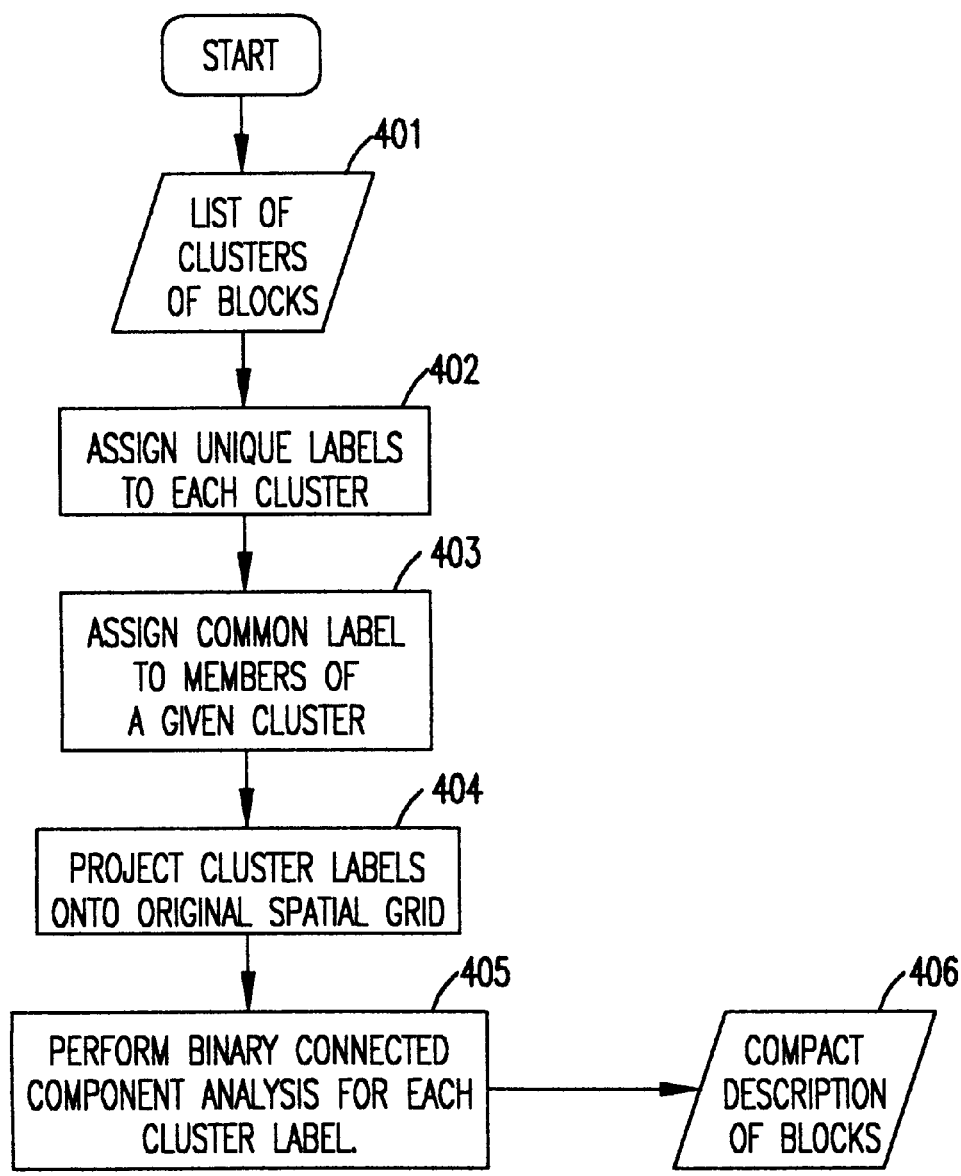
FIG. 4 is a flow diagram showing the logic of the post-processing step which is performed after the clustering operation of FIG. 3.
Figure 5:
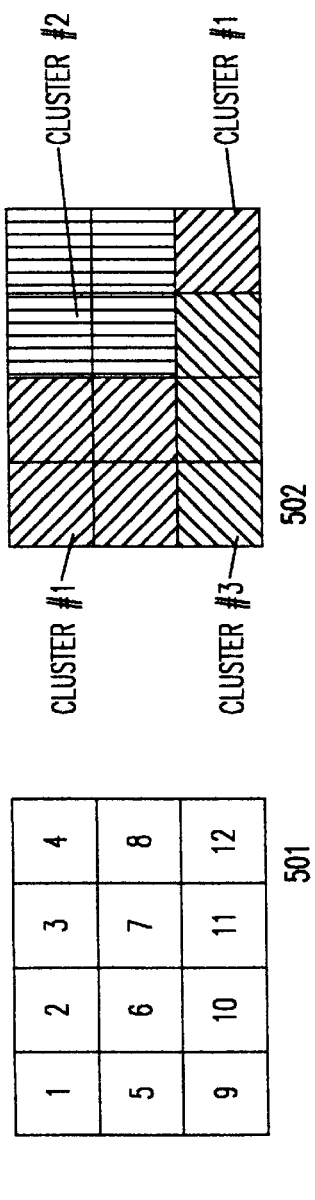
FIG. 5 is a diagram showing clusters produced by the clustering operation of FIG. 3.
Figure 5:
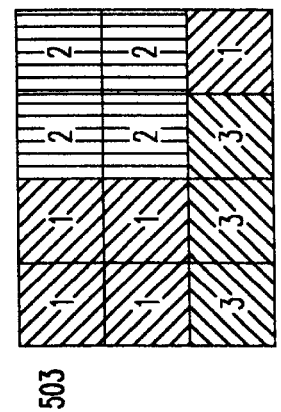

In FIG. 5, 501 represents the spatial arrangement of the twelve blocks. 502 shows the result after the application of the clustering algorithm described in FIG. 3. Three clusters, numbered 1 through 3 have been identified, and are shown by the three cross-hatched regions. Note that in a larger image, there could be several clusters, and they could also be distributed across the page in a non-contiguous fashion. The example we have chosen is a simple one to illustrate the operation of our invention. The post-processing step in function block 310 of FIG. 3 is applied to this result. This post processing step is illustrated in FIG. 4.

We start with the above list of clusters of blocks, which are provided at input block 401. We first assign unique labels to each cluster in function block 402. Thus, the first cluster is assigned a label, say '1'. Similarly, the second cluster is assigned a label, '2', and the third cluster is assigned a label '3'. This is shown at 502 in FIG. 5. In function block 403, we assign the label given to the cluster to members of the cluster. Thus, the label assigned to the first cluster, '1' is inherited by blocks 1, 2, 5, 6, and 12. Similarly, the label assigned to the second cluster, '2' is inherited by blocks 3, 4, 7 and 8, and the label assigned to the third cluster, '3' is inherited by blocks 9, 10 and 11. The labels given to the blocks are then projected onto the original spatial grid that the blocks represent in function block 404. We perform a binary connected component analysis in function block 405 for each cluster label as follows. We treat the members of the spatial grid that possess a given cluster label as the foreground and the rest of the grid as the background. Thus, if we are analyzing the first cluster label, '1', we treat all spatial grid points that possess a label '1' as the foreground, and the rest of the points as background. In other words, blocks 1, 2, 5, 6, and 12 will be treated as the foreground and the rest of the blocks are considered as background. The result of connected component analysis is to identify blocks 1, 2, 5 and 6 as forming a single connected spatial component and block 12 as forming another single spatial component. In this manner, we identify blocks 1, 2, 5 and 6 as being a single connected spatial component which possesses uniform color characteristics, as shown by 504 in FIG. 5. Connected component analysis of binary images is a standard operation that is well known in the image processing community, for instance see *Robot Vision* by B. K. P Horn, MIT Press, 1986, pp. 65–71.

Similarly, blocks 3, 4, 7 and 8 are identified as a common connected component, as shown by 505 in FIG. 5, and blocks 9, 10 and 11 are identified as yet another connected component, as shown by 506 in FIG. 5. Block 12 is identified as yet another component as shown by 507 in FIG. 5. The identification of these connected components allows one to combine the clusters in the feature domain with their spatial locations, thus resulting in a compact description for the entire image, at output block 406. For example, we can have a single descriptor for the connected component that is shown by 504 in FIG. 5, thus reducing the need to replicate the description over four blocks.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for complete segmentation of an image into regions of near-uniform color comprising the steps of:

segmenting the image into blocks of size N×M;

applying color clustering within the segmented blocks using a sequential color clustering algorithm; and merging color clusters that are spatially adjacent and also have similar color characteristics by combining distance in the feature space with distance in the spatial domain to produce spatially compact color regions which have similar color information, thereby producing complete segmentation of the image according to regions of near-uniform color, wherein the step of merging comprises the steps of:

computing distances between cluster centroids for each pair of blocks;

generating a distance matrix; and grouping similar blocks based on computations on the distance matrix.

2. The method for complete segmentation of an image as recited in claim 1, wherein x denotes cluster color centroids found within a block, and two clusters, $x_i$ and $x_j$, are grouped if they satisfy some similarity criteria.

3. The method for complete segmentation of an image as recited in claim 2, wherein the similarity criterion is the identification of clusters $x_i$ and $x_j$ as relative neighbors which will be grouped together if and only if both the following conditions hold:

$$d^2(x_i, x_j) \leq \max\{d^2(x_k, x_i), d^2(x_k, x_j)\} \text{ for all } k,\ k \neq I \text{ and } k \neq j$$

$$d^2(x_i, x_j) \leq \sigma \min\{d^2(x_k, x_i), d^2(x_k, x_j)\} \text{ for all } k,\ k \neq I \text{ and } k \neq j$$

where σ is a factor called relative edge consistency and d denotes the distance, whereby the factor σ controls the fragmentation of the data into different clusters.

* * * * *